United States Patent
Seo et al.

(10) Patent No.: US 8,009,524 B2
(45) Date of Patent: Aug. 30, 2011

(54) OPTICAL PICKUP UNIT, APPARATUS FOR RECORDING/REPRODUCING DATA, METHOD FOR CONTROLLING THE APPARATUS, CONTROL METHOD, AND RECORDING MEDIUM

(75) Inventors: Jeong Kyo Seo, Seoul (KR); In Ho Choi, Seoul (KR); Byung Hoon Min, Seoul (KR)

(73) Assignee: LG Electronics Inc., Seoul (KR)

( * ) Notice: Subject to any disclaimer, the term of this patent is extended or adjusted under 35 U.S.C. 154(b) by 974 days.

(21) Appl. No.: 11/907,570

(22) Filed: Oct. 15, 2007

(65) Prior Publication Data

US 2008/0106982 A1 May 8, 2008

Related U.S. Application Data

(60) Provisional application No. 60/851,772, filed on Oct. 16, 2006.

(30) Foreign Application Priority Data

Jan. 30, 2007 (KR) .................. 10-2007-0009380

(51) Int. Cl.
*G11B 7/00* (2006.01)
(52) U.S. Cl. .............. 369/44.22; 369/44.23; 369/112.24
(58) Field of Classification Search ................. None
See application file for complete search history.

(56) References Cited

U.S. PATENT DOCUMENTS

| 4,973,520 | A | * | 11/1990 | Takada et al. ............. 428/412 |
| 6,104,675 | A | * | 8/2000 | Hatam-Tabrizi ........... 369/13.28 |
| 7,353,808 | B2 | * | 4/2008 | Kakoo ......................... 123/516 |
| 2003/0218946 | A1 | * | 11/2003 | Huang et al. .............. 369/44.23 |
| 2005/0083813 | A1 | | 4/2005 | Ogasawara |

FOREIGN PATENT DOCUMENTS

| EP | 1 684 279 A2 | 7/2006 |
| JP | 2001-006206 | 1/2001 |
| KR | 2002-0015201 | 2/2002 |

OTHER PUBLICATIONS

International Search Report issued Mar. 17, 2008 by the Austrian Patent Office in counterpart International Application No. PCT/KR2007/005011.
Chinese Office Action for corresponding Application No. 2007-80038670 dated Aug. 4, 2010.

* cited by examiner

*Primary Examiner* — Van N Chow
(74) *Attorney, Agent, or Firm* — Harness, Dickey & Pierce, P.L.C.

(57) ABSTRACT

An optical pickup unit, an apparatus for recording/reproducing data, a control method, and a recording medium are disclosed. Each of the optical pickup unit and the recording/reproducing apparatus includes a near-field lens, and uses a high-refraction lens, conically shaped, to effectively use the near-field. Two lens units are required to be compatible with a conventional recording medium. The lens unit is designed in consideration of a distance between the recording medium and the lens, and the tilt or vibration of the lens units is controlled.

18 Claims, 12 Drawing Sheets

(a)          (b)          (c)

OPTICAL PICKUP UNIT, APPARATUS FOR RECORDING/REPRODUCING DATA, METHOD FOR CONTROLLING THE APPARATUS, CONTROL METHOD, AND RECORDING MEDIUM

This application claims the benefit of Korean Patent Application No. 10-2007-0009380, filed on Jan. 30, 2007, which is hereby incorporated by reference as if fully set forth herein.

This application claims the benefit of U.S. Provisional Application No. 60/851,772, filed on Oct. 16, 2006, in the name of inventors Jeong Kyo SEO, Byung Hoon MIN and In Ho CHOI, titled "Apparatus and method for recording and reproducing data to/from optical recording medium", which is hereby incorporated by reference.

BACKGROUND OF THE INVENTION

1. Field of the Invention

The present invention relates to an optical pickup unit, an apparatus for recording/reproducing data, a control method, and a recording medium, and more particularly to an optical pickup unit, and a recording/reproducing apparatus which use a near-field, a control method for effectively using the optical pickup unit and the recording/reproducing apparatus, and a recording medium for use in the same.

2. Discussion of the Related Art

Generally, an optical recording/reproducing device has been used to record/reproduce data in/from a recording medium (e.g., a compact disc (CD) or a digital versatile disc (DVD)).

As consumer's taste grows, a technique for processing the high-quality moving images is required by consumers. As a moving-image compression technology grows, high-density recording mediums are also required by the consumers.

A representative technology from among a variety of kernel technologies for developing the high-density recording medium is a technology associated with an optical pickup unit.

A recording density of the above-mentioned recording medium is influenced by a diameter of an optical signal illuminated on a record layer of the recording medium. In other words, the lower the diameter of the optical signal focused on the recording medium, the higher the recording density.

In this case, the diameter of the focused optical signal is mainly determined by two factors. One factor is a Numeric Aperture (NA) indicating a throughput of the lens used to focus the optical signal, and the other factor is a wavelength of the optical signal focused on the lens.

The shorter the wavelength of the focused optical signal, the higher the recording density. Therefore, a short-wavelength optical signal is used to increase the recording density. If a blue-colored optical signal is used instead of a red-colored optical signal, the recording density becomes higher.

However, a far-field recording system's head employing a general lens has a limitation in diffracting the optical signal, so that there is a limitation in decreasing the diameter of the optical signal.

In order to solve the above-mentioned problems, many developers are conducting intensive research into a near-field recording (NFR) device based on the near-field optics, so that the NFR device can record or reproduce information smaller than the wavelength of the optical signal.

The NFR device including a near-field forming lens acquires an optical signal of less than a diffraction limitation using an improved near-field forming lens having a refractive index higher than that of an objective lens.

The optical signal is configured in the form of evanescent waves, and is then propagated to a recording medium adjacent to an interface or boundary, so that high-density bit information is stored in the recording medium. In this case, for the convenience of description, an area for forming evanescent waves is referred to as a near-field.

However, the above-mentioned conventional art has the following problems.

The above-mentioned optical recording/reproducing device based on the near-field cannot be compatible with conventional recording mediums.

In addition, the above-mentioned optical recording/reproducing device has difficulty in solving the collision problems caused by a tilt or vibration encountered while a desired short distance between the recording medium and the lens is maintained.

SUMMARY OF THE INVENTION

Accordingly, the present invention is directed to an optical pickup unit, an apparatus for recording/reproducing data, a control method, and a recording medium that substantially obviates one or more problems due to limitations and disadvantages of the related art.

An object of the present invention is to provide a lens suitable for a near-field recording/reproducing device, an optical pickup unit equipped with the lens, and/or an optical recording/reproducing apparatus equipped with the lens.

Another object of the present invention is to provide a near-field recording/reproducing apparatus capable of using a conventional recording medium.

Yet another object of the present invention is to provide a method and apparatus for effectively controlling a tilt or vibration using a near-field recording/reproducing apparatus.

Yet another object of the present invention is to provide a recording medium which can be effectively used for a near-field recording/reproducing apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical pickup comprising; a first lens unit including a first objective lens and a high-refraction lens; a second lens unit including a second objective lens; and a separating/combining unit for separating or combining paths of an optical signal passing through the first or second lens unit.

Preferably, there is a difference in height between the first lens unit and the second lens unit.

Preferably, the height difference is decided in consideration of a tilt limitation angle or a vibration range during a recording/reproducing operation.

Preferably, a distance between the second lens unit and a recording medium does not exceed a focal length.

Preferably, a minimum center distance between a center axis of the first lens unit and a center axis of the second lens unit is equal to the sum of a radius of the first lens unit and a radius of the second lens unit.

Preferably, a maximum value of the center distance is higher than the minimum center distance by 2 mm.

Preferably, the high-refraction lens has a refractive index of at least 2.

Preferably, a numeric aperture (NA) of the first lens unit is 1.45~1.85.

Preferably, a numeric aperture (NA) of an optical system is lower than a refractive index of either a substrate or a passivation layer of a recording medium.

Preferably, the high-refraction lens has a spherical aberration, and the first objective lens compensates for the spherical aberration of the high-refraction lens.

Preferably, the high-refraction lens is configured in the form of a conical structure.

Preferably, one end of the high-refraction lens is hemispherically shaped to face the first objective lens, and the other end of the high-refraction lens is conically shaped to face a recording medium.

Preferably, a diameter of a bottom area of the conical structure is 30 μm~40 μm.

In another aspect of the present invention, there is provided an apparatus for recording/reproducing data comprising: a first lens unit including a first objective lens and a high-refraction lens; a second lens unit including a second objective lens; a separating/combining unit for separating or combining paths of an optical signal passing through the first or second lens unit; a signal generator for generating a control signal corresponding to an interval between the first lens unit and a recording medium using an optical signal received from the first lens unit; and a control part configured to control the interval between the first lens unit and the recording medium within a predetermined range using the control signal.

Preferably, the signal generator generates the control signal corresponding to intensity of an optical signal fully reflected from the high-refraction lens.

Preferably, the control part enables the control signal to be maintained at a predetermined value.

Preferably, the control part limits a tilt of the high-refraction lens to a maximum of 0.1°.

Preferably, the control part limits a range of vibrations of the recording medium to a maximum of 0.1 mm.

In yet another aspect of the present invention, there is provided a control method comprising: detecting a physical tilt limitation angle between a lens and a recording medium spaced apart from each other by a predetermined distance; detecting an optical limitation incident angle of an optical signal incident on the lens; and comparing the physical tilt limitation angle with the optical limitation angle incident angle, and controlling a tilt of the lens or the recording medium on the basis of a smaller one of the two angles.

Preferably, the detecting step of the physical tilt limitation angle includes: detecting a physical tilt limitation angle by an equation $$\alpha = \tan^{-1}\left(\frac{d}{r}\right),$$

where "d" is a distance between the lens and the recording medium, and "r" is a radius of a cross-section of the lens facing the recording medium.

Preferably, the method further comprises: controlling the tilt of the lens using the detected physical tilt limitation angle.

Preferably, an angle between a center axis of the lens and the recording medium is limited to 0.085°~0.115°.

Preferably, the detecting step of the optical limitation incident angle includes: detecting the optical limitation incident angle using coma-aberration.

Preferably, the method further comprises: limiting a vibration range of the recording medium.

Preferably, the vibration range of the recording medium is limited to 0.1 mm.

A recording medium for use in the recording/reproducing apparatus comprises: at least one record layer, wherein a location of a first record layer is fixed.

A first record layer L0 of a single-layered recording medium and a first record layer L0 of a multi-layered recording medium are arranged at the same location, so that the recording/reproducing apparatus can easily access the first record layer (L0).

In this case, the recording medium may include a passivation layer, and the thickness of the passivation layer is decided in consideration of a physical tilt limitation angle. The passivation layer has a thickness of 5 μm.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

Figure 1:
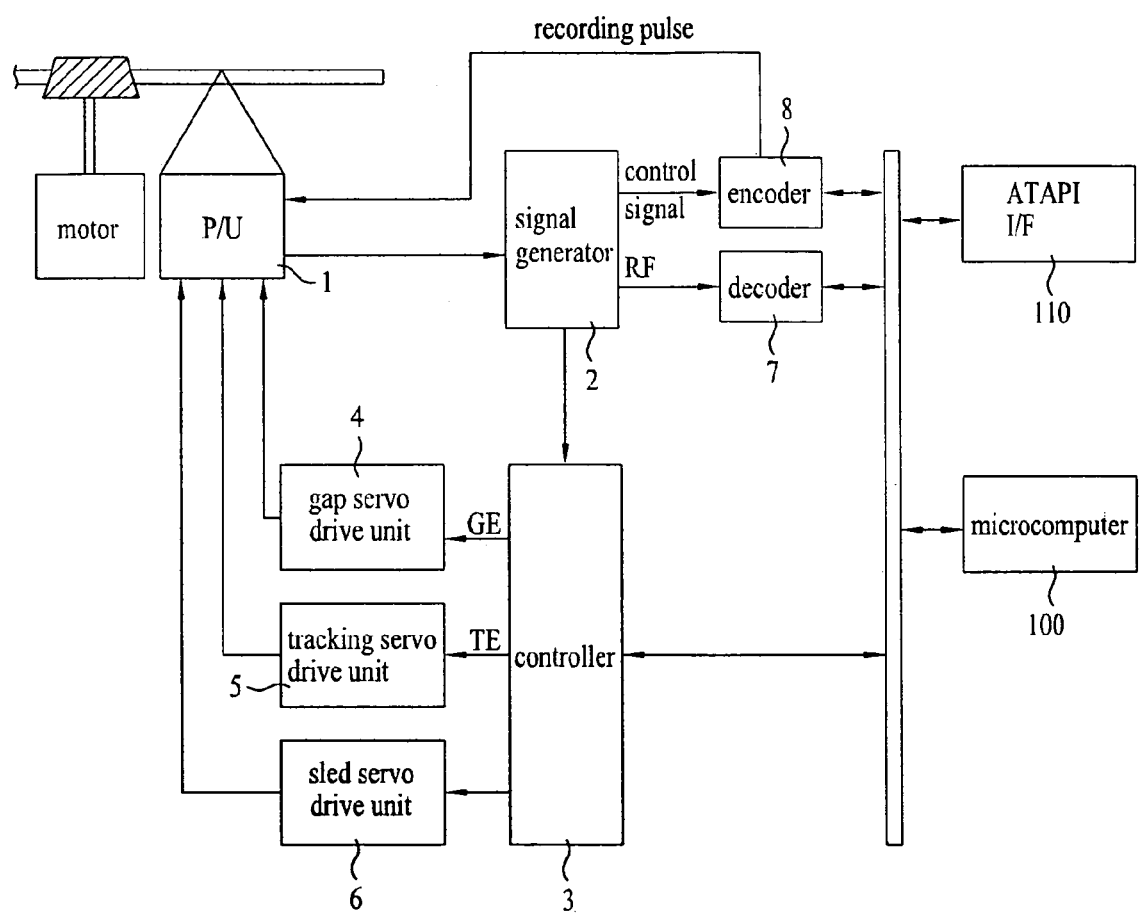
FIG. 1 is a block diagram illustrating a recording/reproducing apparatus according to the present invention.

FIG. 1 is a block diagram illustrating a recording/reproducing apparatus according to the present invention. The above-mentioned recording/reproducing apparatus will hereinafter be described with reference to FIGS. 2 and 3.

Referring to FIG. 1, the optical pickup unit (P/U) 1 illuminates an optical signal on a recording medium, focuses the optical signal reflected from the recording medium, and generates a desired signal.

Figure 2:
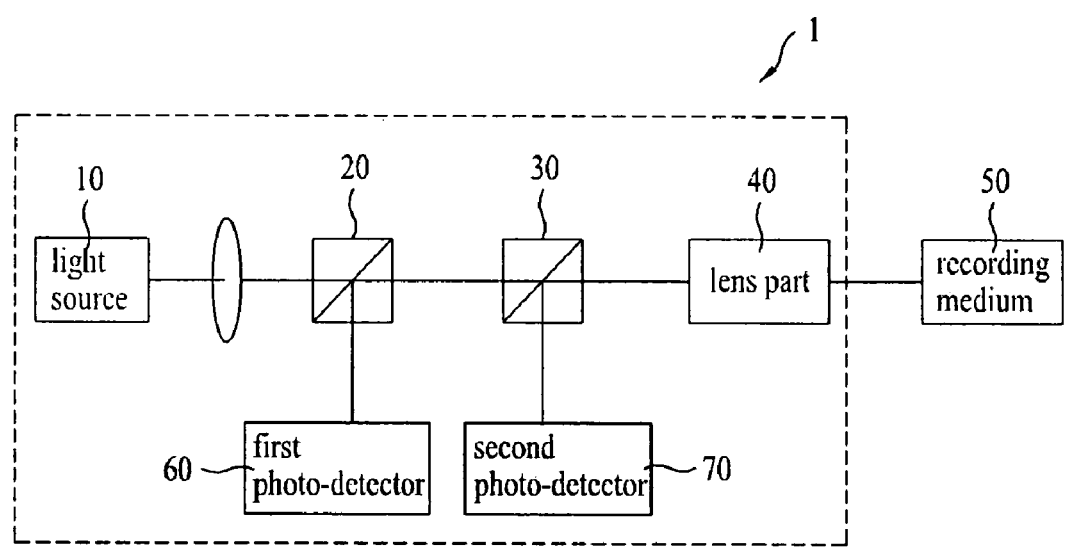
FIG. 2 is a block diagram illustrating an optical pickup unit contained in the recording/reproducing apparatus according to the present invention.

The optical system (not shown) of the optical pickup unit 1 can be configured as shown in FIG. 2.

FIG. 2 is a block diagram illustrating an optical pickup unit contained in the recording/reproducing apparatus according to the present invention.

The optical system contained in the optical pickup unit 1 includes a light source 10, separating/combining units 20 and 30, a lens unit 40, and first and second photo-detection units 60 and 70.

The light source 10 may be implemented with a laser having good linearity. For example, the light source 10 may be implemented with a laser diode.

An optical signal to be emitted from the light source 10 may be a parallel optical signal, so that the parallel optical signal is to be illuminated on the recording medium. Therefore, in order to implement the parallel optical signal, a lens such as a collimator may be arranged to a traveling path of the optical signal emitted from the light source 10.

The separating/combining units 20 and 30 separate paths of optical signals received in the same direction from each other, or combines paths of other optical signals received in different directions.

The apparatus according to the present invention includes a first separating/combining unit 20 and a second separating/combining unit 30, and detailed descriptions of the first and second separating/combining units 20 and 30 will hereinafter be described.

The first separating/combining unit 20 partially passes the incident optical signal, and partially reflects the incident optical signal. According to the present invention, the first separating/combining unit 20 is implemented with a non-polarized beam splitter (NBS).

The second separating/combining unit 30 passes only polarization of a specific direction according to polarization directions. According to the present invention, the second separating/combining unit 30 may be implemented with a polarized beam splitter (PBS).

For example, in the case of using a linear polarization, the second separating/combining unit 30 may pass only vertical polarization components simultaneously while reflecting horizontal polarization components. Otherwise, the second separating/combining unit 30 may also pass only horizontal polarization components simultaneously while reflecting the vertical polarization components.

The lens unit 40 focuses the optical signal emitted from the light source 10 onto the recording medium 50.

Figure 3:
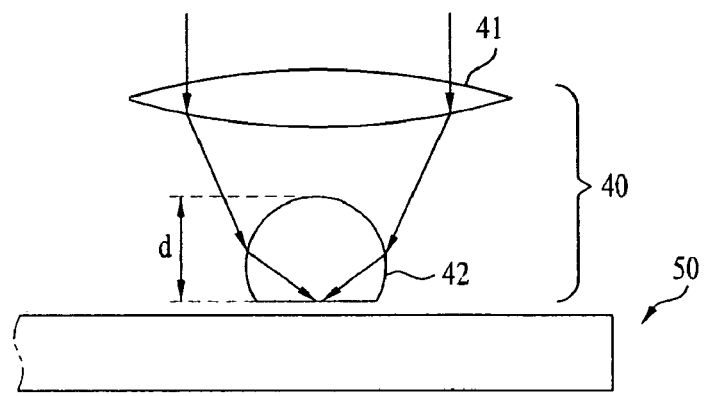
FIG. 3 is a cross-sectional view illustrating a lens of an optical pickup unit along with a recording medium according to the present invention.

FIG. 3 is a cross-sectional view illustrating a lens of an optical pickup unit along with a recording medium according to the present invention. Referring to FIG. 3, the lens unit 40 according to the present invention includes an objective lens 41 and a high-refraction lens 42 arranged on a path along which the optical signal generated from the objective lens 41 is incident on the recording medium 50.

In other words, since the lens unit 40 includes a high-refraction lens along with the objective lens 41, so that the NA of the lens unit 40 increases, resulting in the occurrence of evanescent waves.

In this case, for the convenience of description and better understanding of the present invention, the high-refraction lens 42 is called a near-field forming lens.

The near-field forming lens 42 may be implemented with a solid immersion lens (SIL), or may also be implemented with a hemispherical lens or super-hemispherical lens formed by cutting the spherical lens. A detailed embodiment of the near-field forming lens 42 will hereinafter be described with reference to the annexed drawings.

Figure 4:
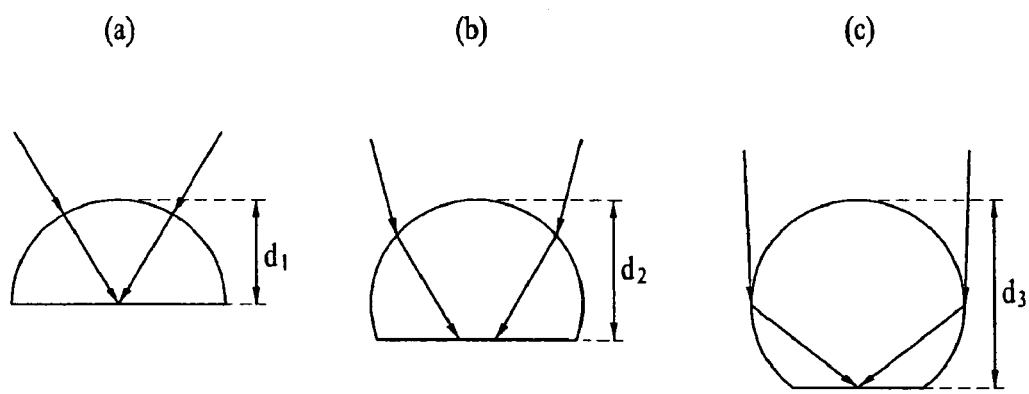
FIGS. 4A~4C are cross-sectional views of a near-field forming lens of the recording/reproducing apparatus according to an embodiment of the present invention.

According to a first embodiment of the near-field forming lens 42, the near-field forming lens 42 may be manufactured by cutting one end of a spherical lens, as shown in FIG. 4. If the spherical lens is cut, various-sizes of near-field forming lenses 42 having different thicknesses (d) can be acquired as shown in FIG. 4. FIGS. 4A-4C are cross-sectional views of the near-field forming lens of the recording/reproducing apparatus according to an embodiment of the present invention.

Figure 5:
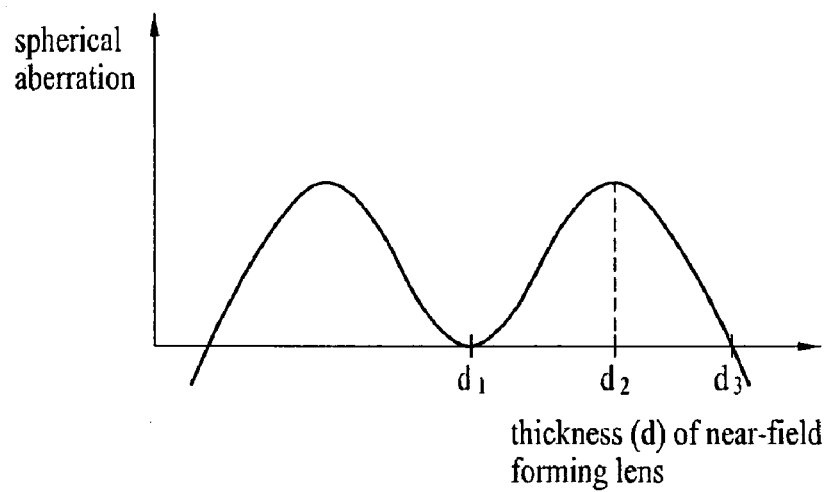
FIG. 5 is a corresponding graph illustrating a variation of a spherical aberration influenced by a variation of a thickness (d) of the near-field forming lens according to the present invention.

FIG. 5 is a corresponding graph illustrating a variation of a spherical aberration influenced by a variation of the thickness (d) of the near-field forming lens according to the present invention. The spherical aberration affected by the thickness of the near-field forming lens 42 is shown in FIG. 5. A spherical aberration of FIG. 4A is denoted at the point "d1". A spherical aberration of FIG. 4B is denoted at the point "d2". A spherical aberration of FIG. 4C is denoted at the point "d3".

As shown in FIG. 5, if the near-field forming lens 42 has the thickness of d1 or d3, there is no spherical aberration. The point d1 or d3 is called an aplanatic point. In the case of using a near-field forming lens 42 having no spherical aberration as shown in FIG. 4A or 4C, the influence caused by the spherical aberration can be minimized.

In this case, the effective numeric aperture (NA) of the lens unit has a constant relationship with a refractive index of the recording medium. In this case, the NA is indicative of a total number of NAs of the lens unit 40 including the above-mentioned near-field forming lens 42.

A first NA acquired when a hemispherical near-field forming lens is used and a second NA acquired when a super-hemispherical near-field forming lens can be calculated by the following equations.

[Equation]

$$NA1 = \text{near-field forming lens' refractive index}(n) * \sin\theta$$

$$NA2 = \text{near-field forming lens' refractive index}(n)^2 * \sin\theta$$

In Equation, θ is indicative of a maximum value of an angle between an optical signal passing through the lens and an optical axis.

A high-refraction material of the near-field forming lens 42 may be LaSF35, KTaO3, or diamond. The NA acquired at the wavelength of 405 nm in the above-mentioned cases is shown in the following Table 1:

TABLE 1

| | Refractive index $n(\lambda = 405 \text{ nm})$ of Near-field forming lens | NA1 | NA2 |
|---|---|---|---|
| LaSF35 | 2.09 | 1.45 | 1.85 |
| KTaO3 | 2.3815 | 1.85 | 2.2 |
| Diamond | 2.458 | 1.91 | 2.34 |

Preferably, the refractive index of the near-field forming lens 42 may be set to "2". If the super-hemispherical near-field forming lens 42 is made of LaSF35 and the NA of the objective lens 41 is set to about 0.7, the NA of the super-hemispherical near-field forming lens 42 is 1.85.

In this case, the NA formed by the objective lens 41 and the near-field forming lens 42 is correlated with the refractive index of the recording medium 50.

In more detail, if the NA 1 or NA2 is set to "1" or higher as shown in the above-mentioned Table 1, and is higher than a refractive index of the recording medium 50, total reflection is optically implemented.

In order to prevent the total reflection from being generated, the NA must be less than a refractive index of either a substrate of the recording medium 50 or a passivation layer.

A second embodiment of the near-field forming lens 42 will hereinafter be described in detail. A specific lens having a spherical aberration is used as the near-field forming lens 42. In this case, the objective lens 41 is designed to compensate for the spherical aberration of the above-mentioned near-field forming lens 42. A detailed description of the method for compensating for the spherical aberration will hereinafter be described with reference to the annexed drawings.

Referring to Table 1, the NA1 of the hemispherical lens shown in FIG. 4A is relatively lower than the NA2 of the super-hemispherical lens. As described above, the NA is defined as n sin θ. If a refractive index (n) or angle (θ) of the medium increases, the NA increases, and a resolution for identifying two neighboring points also increases.

On the other hand, the NA of the super-hemispherical lens shown in FIG. 4C is defined as $n^2 \sin \theta$, so that the NA of the super-hemispherical lens of FIG. 4C is higher than that of the spherical lens of FIG. 4A, and the near-field recording/reproducing apparatus prefers to use the super-hemispherical lens.

However, it is difficult to manufacture the super-hemispherical lens of FIG. 4C. As shown in FIG. 5, the slope of the spherical aberration is abruptly changed at the point "d3" corresponding to the super-hemispherical lens. In other words, if a thickness error encountered by a manufacturing process of the super-hemispherical lens occurs, the spherical aberration has serious errors.

Therefore, the super-hemispherical lens must be cut to have a correct thickness, so that it is difficult to manufacture the desired super-hemispherical lens.

Therefore, as shown in FIG. 4B, there must be developed an improved near-field forming lens 42, which has an NA higher than that of the spherical lens and can be easily manufactured. In this case, the spherical aberration of the near-field forming lens 42 can be compensated by the objective lens 41.

Figure 6:
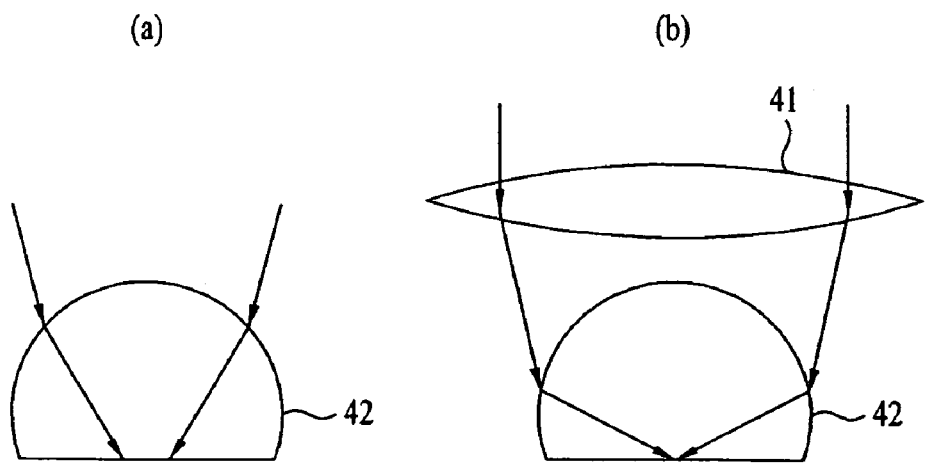
FIG. 6 is a cross-sectional view illustrating a near-field forming lens and an objective lens for compensating for a spherical aberration of the near-field forming lens according to the present invention.

FIG. 6 is a cross-sectional view illustrating a near-field forming lens and an objective lens for compensating for a spherical aberration of the near-field forming lens according to the present invention. In more detail, the lens unit 40 of FIG. 6 compensates for a spherical aberration of the near-field forming lens 42 having a thickness of about "d2" of FIG. 4B, using the objective lens 41.

In this case, the objective lens 41 is designed to have a spherical aberration opposite to that of the above-mentioned manufactured near-field forming lens 42, so that a desired lens unit 40 can be implemented. The desired lens unit 40 has a compensated spherical aberration, can be easily manufactured, and has a high NA.

In this case, as shown in FIG. 5, in the case of the lens having a thickness of about d2, the spherical aberration influenced by a thickness variation is changed according to a gentle curve, so that the range of errors encountered by the manufacturing process is very narrow, resulting in the implementation of effectiveness. Specifically, the slope of a tangent line becomes zero at a spherical-aberration local-maximum point, resulting in the implementation of higher effectiveness.

In other words, if the near-field forming lens 42 of the spherical-aberration local-maximum point's thickness "d2" is manufactured, the spherical aberration does not greatly change although unexpected errors occur in the thickness "d2". As a result, the lens unit 40 having a correctly-compensated spherical aberration can be manufactured using the objective lens 41. The NA of the lens unit 40 corresponds to 1.8.

Figure 7A:
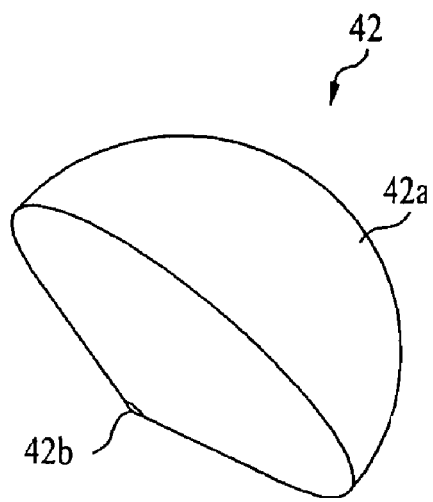
FIGS. 7A and 7B are perspective views illustrating a near-field forming lens of the recording/reproducing apparatus according to another embodiment of the present invention.
Figure 7B:
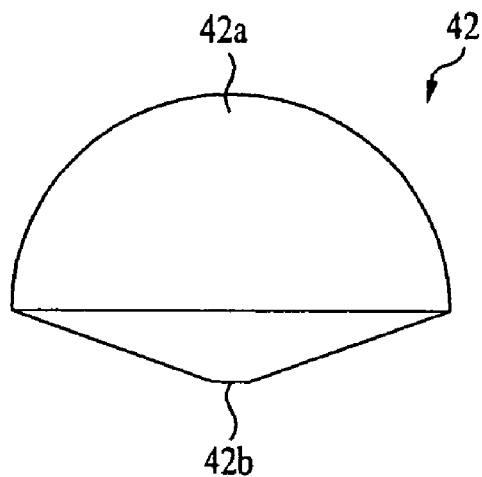

FIGS. 7A and 7B are perspective views illustrating a near-field forming lens of the recording/reproducing apparatus according to another embodiment of the present invention.

According to a third embodiment of the near-field forming lens, a conical near-field forming lens can be manufactured as shown in FIG. 7. For example, the cut cross-section of the near-field forming lens 42 can be configured in the form of a conical structure. The part facing the objective lens 41 of FIG. 7 is hemispherically shaped in the same manner as in the above-mentioned embodiment, but the other part facing the recording medium 50 is conically shaped. A physical tilt limitation angle α increases because the area of the part contacting the recording medium 50 is minimized, and at the same time a minimum area for illuminating the optical signal on the recording medium is implemented. A detailed description thereof will be described later.

The optical system of the optical pickup unit 1 including the lens unit 40 is very close to the recording medium 50. In more detail, if an interval between the lens unit 40 and the recording medium 50 is shorter than about ¼ (or less) of the optical wavelength (i.e., λ/4), some parts of the optical signal incident on the lens unit 40 are not fully reflected from the surface of the recording medium 50, form evanescent waves, and pass through the recording medium 50, so that the evanescent waves are applied to a record layer. The evanescent waves applied to the record layer can be used to record/reproduce data.

However, if the interval between the lens unit 40 and the recording medium 50 is longer than at least λ/4, the wavelength of the optical signal loses characteristics of the evanescent waves and returns to an original wavelength, so that the evanescent waves are fully reflected from the surface of the recording medium 50.

Therefore, the interval between the lens unit 40 of the recording/reproducing apparatus based on the near-field and the recording medium 50 is maintained to exceed the value of λ/4. In this case, λ/4 is indicative of a near-field limitation.

The first and second photo-detection units 60 and 70 receive the reflected optical signal, perform photoelectric conversion on the received reflected optical signal, and generate an electric signal corresponding to the light quantity. The apparatus according to the present invention includes a first photo-detection unit 60 and a second photo-detection unit 70.

The first photo-detection unit 60 and the second photo-detection unit 70 may be implemented with a photo-detector divided into several units in a signal track direction or radial direction of the recording medium 50. For example, the first photo-detection unit 60 and the second photo-detection unit 70 may be implemented with two photo-detectors PDA and PDB, respectively. In this case, the photo-detector PDA generates the electric signal A proportional to the received light quantity, and the other photo-detector PDB generates an electric signal B proportional to the received light quantity.

Otherwise, the photo-detection units 60 and 70 may also be implemented with four photo-detectors PDA, PDB, PDC, and PDD, each of which is divided into two units in the signal track direction or radial direction of the recording medium 50.

The above-mentioned structures of the photo-detectors contained in the photo-detection units 60 and 70 are not limited to the above-mentioned embodiment, and can also be modified in various ways.

The signal generator 2 of FIG. 1 generates a radio frequency (RF) signal required for reproducing data using the signal generated from the optical pickup unit 1, and also generates a gap-error (GE) signal and a tracking error signal to control the servo.

The controller 3 receives a signal created from the photo-detection unit or the signal generator 2, and generates a control signal or a drive signal.

For example, the controller 3 performs signal processing on the GE signal, and outputs a drive signal capable of controlling the interval between the lens unit 40 and the recording medium 50 to the gap-servo driver 4. The controller 3 limits a dynamic range of the lens unit 40 or the recording medium 50 according to a physical tilt limitation angle ($\alpha$) or an optical limitation incident angle ($\beta$).

The gap-servo driver 4 drives an actuator (not shown) contained in the optical pickup unit, so that it vertically moves the optical pickup unit 1 or the lens unit 40 of the optical pickup unit. As a result, an interval between the lens unit 40 and the recording medium 50 can be constantly maintained.

The gap-servo driver 4 may also be used as a focus-servo. For example, upon receiving a focus-control signal from the controller 3, the optical pickup unit 1 or the lens unit 40 of the optical pickup unit 1 may trace not only the rotation of the recording medium 50 but also a vertical movement of the recording medium 50.

The tracking-servo driver 5 drives a tracking actuator (not shown) contained in the optical pickup unit 1, so that the optical pickup unit 1 or the lens unit 40 of the optical pickup unit moves in a radial direction to correct the location of the optical signal.

Therefore, the optical pickup unit 1 or the lens unit 40 of the optical pickup unit can trace a predetermined track contained in the recording medium 50.

The tracking-servo driver 5 moves the optical pickup unit 1 or the lens unit 40 of the optical pickup unit 1 in the radial direction according to a track-moving command of the track.

The sled-servo driver 6 drives a sled motor (not shown) used to move the optical pickup unit 1, so that it can move the optical pickup unit 1 in the radial direction according to a track-moving command.

The above-mentioned recording/reproducing apparatus may be connected to a host such as a PC. The host transmits the recording/reproducing command to the microprocessor 100 via the interface, receives reproduced data from the decoder 7, and transmits data to be recorded to the encoder 8.

The microprocessor 100 controls the decoder 7, the encoder 8, and the controller 3 upon receiving the recording/reproducing command from the host.

In this case, the above-mentioned interface may be implemented with an Advanced Technology Attached Packet Interface (ATAPI) 110. In this case, the ATAPI 110 is the interface standard between the optical recording/reproducing apparatus (e.g., a CD or DVD drive) and the host, and is used to transmit data decoded by the optical recording/reproducing apparatus to the host. The ATAPI 110 converts the decoded data into a packet-shaped protocol capable of being processed by the host, and transmits the converted result.

In the case of the optical pickup unit 1 for use in the above-mentioned recording/reproducing apparatus, a method for operating the optical pickup unit 1 will hereinafter be described on the basis of the traveling direction of the optical signal emitted from the light source 10 of the optical system. In the remaining cases other than the above-mentioned case, the method for operating the optical pickup unit 1 will be described on the basis of the signal flow.

The optical signal emitted from the light source 10 of the pickup unit 1 is incident on the first separating/combining unit 20, so that some parts of the optical signal are reflected and some parts of the same are incident on the second separating/combining unit 30.

The second separating/combining unit 30 passes vertical polarization components contained in the linearly-polarized optical signal, and reflects horizontal polarization components. Needless to say, the second separating/combining unit 30 passes the horizontal polarization components, and reflects the vertical polarization components as necessary. A polarization conversion surface (not shown) may be further included in a path of the optical signal passing the second separating/combining unit 30, and the above-mentioned polarization conversion surface will hereinafter be described in detail.

The optical signal passing the first separating/combining unit 30 is incident on the lens unit 40. In this case, the optical signal incident on the objective lens of the lens unit 40 generates evanescent waves while passing through a near-field forming lens. In more detail, if the optical signal is incident on the near-field forming lens at a threshold angle or more, the optical signal is fully reflected from the lens surface.

However, a short interval of about 50 nm is maintained between the near-field forming lens and the recording medium in order to form the near-field, so that some optical signals are not reflected by the evanescent-coupling effect, but are applied to the recording medium. The evanescent waves arrive at the record layer of the recording medium 50, so that desired data may be recorded or reproduced.

The optical signal reflected from the recording medium 50 is re-applied to the second separating/combining unit 30 via the lens unit 40. In this case, the polarization conversion surface (not shown) may be located at the optical path toward the second separating/combining unit 30. The polarization conversion surface changes polarization directions of the optical signal arriving at the recording medium 50 and the reflected optical signal.

For example, if a quarter wave plate (QWP) is used as the polarization conversion surface, the QWP performs the left-hand circular polarization on the optical signal incident on the recording medium 50, and performs the right-hand circular polarization on the other optical signal traveling in the reverse direction.

As a result, the polarization direction of the reflected optical signal passing through the QWP is changed to another polarization direction different from that of the incident optical signal, and there is a difference of 90° between the two polarization directions.

Therefore, when the optical signal, of which only horizontal polarization components pass the second separating/combining unit 30, is reflected from the recording medium 50, and re-enters the second separating/combining unit 30, the optical signal can have vertical polarization components. The reflected optical signal having the vertical polarization components is reflected from the second separating/combining unit 30, and then enters the second photo-detection unit 70.

In the meantime, the numeric aperture (NA) of the lens unit 40 of the near-field recording/reproducing apparatus is higher than "1", so that the polarization direction of the optical signal has unexpected distortion while the optical signal is illuminated and reflected via the lens unit 40. In other words, some parts of the reflected optical signal entering the second separating/combining unit 30 has horizontal polarization components, and pass through the second separating/combining unit 30. The reflected optical signal passing the second separating/combining unit 30 is applied to the first separating/combining unit 20.

The first separating/combining unit 20 passes some parts of the incident optical signal, and reflects some parts of the same. The optical signal reflected from the first separating/combining unit 20 is incident on the first photo-detection unit 60.

The first photo-detection unit 60 and the second photo-detection unit 70 output electric signals corresponding to the light quantity of the received reflection optical signal. The signal generator 2 generates a gap-error (GE) signal, a tracking-error (TE) signal, or a RF signal using the electric signals generated from the first and second photo-detection units 60 and 70.

The above-mentioned signal created in the signal generator 2 will hereinafter be described with reference to FIG. 4. In this case, each of the first photo-detection unit 60 and the second photo-detection unit 70 is composed of two photo-detectors as shown in FIG. 3.

Two photo-detectors contained in the first photo-detection unit 60 output electric signals A and B corresponding to the received light quantity, respectively. Two photo-detectors contained in the second photo-detection unit 70 output electric signals C and D corresponding to the received light quantity, respectively.

Upon receiving the A and B signals from the first photo-detection unit 60. The signal generator 2 may generate a gap-error (GE) signal to control the interval between the lens and the recording medium 50.

The GE signal is generated when output signals of all photo-detectors contained in the first photo-detection unit 60 are summed up. The resultant GE signal can be represented by the following equation 1:

$$GE = A + B \quad \text{[Equation 1]}$$

In Equation 1, the GE signal corresponds to a total sum of electric signals corresponding to the light quantity, so that it is proportional to the light quantity of the reflected optical signal applied to the first photo-detection unit 60.

Upon receiving the C and D signals from the second photo-detection unit 70, the signal generator 2 may generate the RF signal for recording/reproducing data or the TE signal for controlling the tracking operation.

The RF signal is created when output signals of the photo-detectors contained in the second photo-detection unit 70 are summed up, and is represented by RF=C+D. The TE signal indicates a difference between output signals of the photo-detectors contained in the second photo-detection unit 70, and is represented by TE=C−D.

Figure 8:
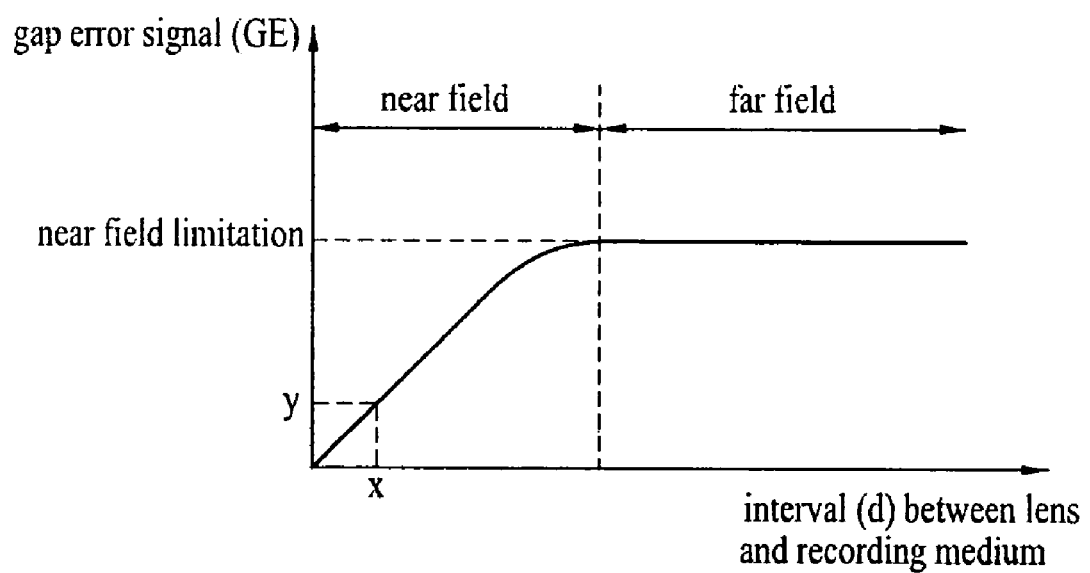
FIG. 8 is a correlation diagram illustrating a variation of a gap-error (GE) signal influenced by an interval between the lens and the recording medium according to the present invention.

FIG. 8 is a correlation diagram illustrating a variation of a gap-error (GE) signal influenced by an interval between the lens and the recording medium according to the present invention.

Referring to FIG. 8, as the interval (d) between the lens unit 40 and the recording medium 50 in a near-field increases, the GE signal exponentially increases. In a far-field escaping from the near-field, the interval (d) between the lens unit 40 and the recording medium 50 is constant. A detailed description thereof will hereinafter be described.

If the interval (d) between the lens unit 40 and the recording medium 50 escapes from the near-field (i.e., if the interval (d) reaches a boundary value λ/4 between the near-field and the far-field), the optical signal having an incident angle of more than a threshold angle is fully reflected from the recording medium 50.

If the interval (d) between the lens unit 40 and the recording medium 50 is less than λ/4 so that the near-field is formed, the optical signal having an incident angle of more than the threshold value partially passes through the recording medium 50 although the lens unit 40 does not contact the recording medium 50, so that the resultant signal arrives at the record layer.

Therefore, the shorter the interval (d) between the lens unit 40 and the recording medium 50, the greater the light quantity of the optical signal passing through the recording medium 50. And, the shorter the interval (d) between the lens unit 40 and the recording medium 50, the lower the light quantity of the optical signal fully reflected from the recording medium 50.

The longer the interval (d) between the lens unit 40 and the recording medium 50, the lower the light quantity of the optical signal passing through the recording medium 50. And, the longer the interval (d) between the lens unit 40 and the recording medium 50, the greater the light quantity of the optical signal fully reflected from the recording medium 50. As a result, the graph of FIG. 8 is acquired.

As the interval (d) between the lens unit 40 and the recording medium 50 increases in a near-field, the GE signal's intensity proportional to the reflected optical signal's intensity exponentially increases. If the interval (d) between the lens unit 40 and the recording medium 50 escapes from the near-field, the GE signal's intensity has a constant value (i.e., a maximum value).

Based on the above-mentioned principles, the GE signal has a constant value on the condition that a constant interval (d) between the lens unit 40 and the recording medium 50 is maintained in the near-field. In other words, the feedback control is executed to maintain the GE signal of a predetermined value, so that the interval (d) between the lens unit 40 and the recording medium 50 can be constantly maintained.

A method for maintaining a constant interval between the lens unit 40 and the recording medium 50 using the GE signal will hereinafter be described with reference to FIG. 9.

Figure 9:
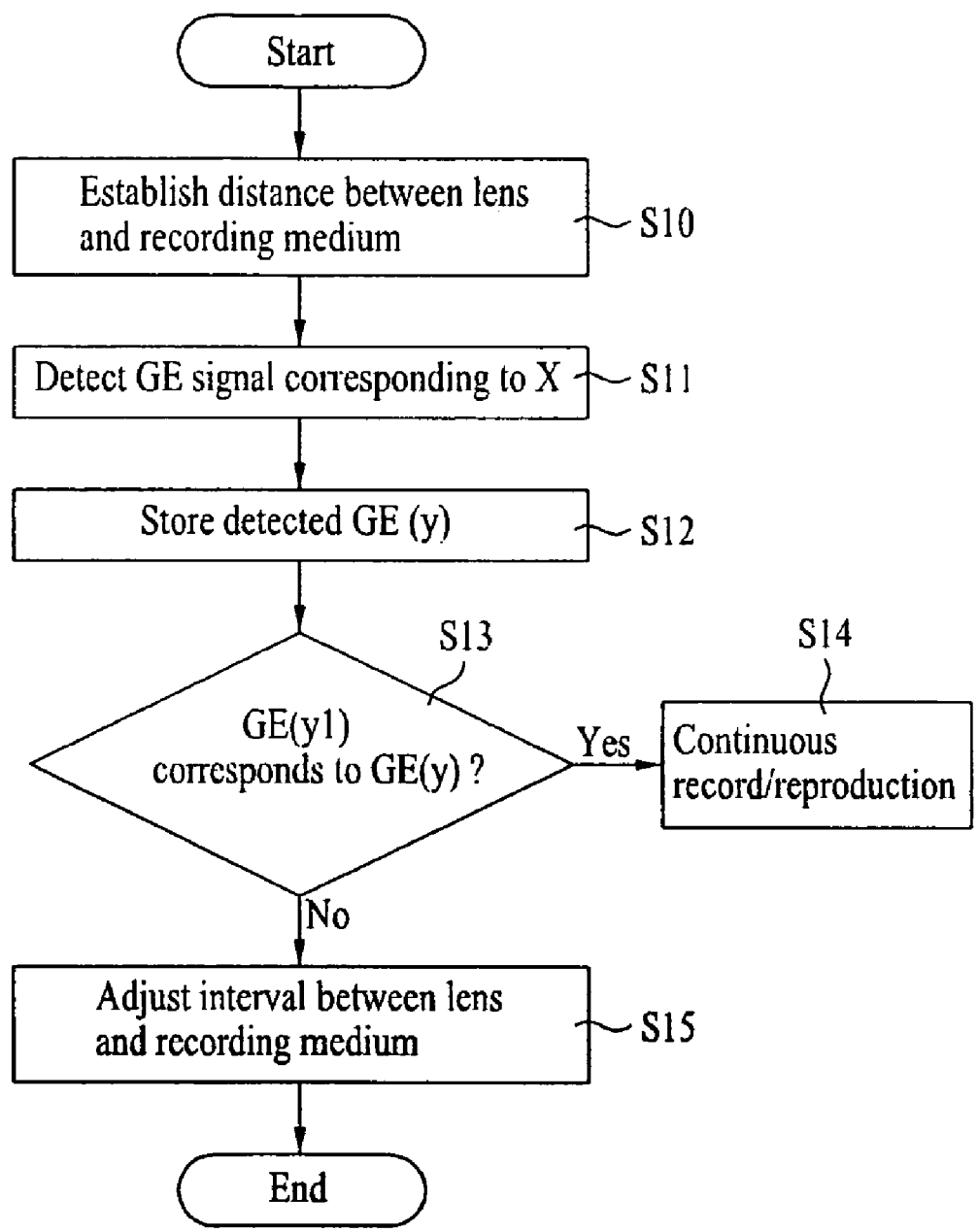
FIG. 9 is a flow chart illustrating an interval control method according to the present invention.

FIG. 9 is a flow chart illustrating an interval control method according to the present invention.

Referring to FIG. 9, a interval (x) between the lens unit 40 and the recording medium 50 is decided to detect the reflected optical signal at step S10. The GE signal (y) detected at the decided interval (x) is detected at step S11. The detected GE signal (y) is stored at step S12.

In this case, the value "y" may be higher than about 10~20% of the near-field limitation value λ/4, so that the possibility of generating a collision between the lens unit 40 and the recording medium 50 is lowered. Also, the value "y" may be less than about 80~90% of the near-field limitation value λ/4, so that the possibility of generating a specific situation, in which the interval (d) between the lens unit 40 and the recording medium 50 becomes longer and escapes from the near-field, is lowered. The above-mentioned steps may be executed before data is recorded or reproduced in/from the recording medium 50 as necessary.

While data is recorded or reproduced in/from the rotating recording medium 50, the optical signal is illuminated on tracks of the recording medium, and is received in the first photo-detection unit 60. The signal generator 80 generates the GE signal using the output signal of the first photo-detection unit 60. In this case, it is determined whether the detected GE signal (y1) corresponds to the stored GE signal (y) at step S13.

In this case, if the detected GE signal (y1) corresponds to the stored GE signal (y) at step S13, this means that a desired setup interval is maintained, so that the data recording/reproducing process can be continuously executed at step S14. Otherwise, if the detected GE signal (y1) does not correspond to the stored GE signal (y) at step S13, this means that a variation of the setup interval occurs, so that the interval (d) between the lens unit 40 and the recording medium 50 can be adjusted.

In this way, the lens unit 40 is controlled according to the feedback control method using the GE signal detected at the recording/reproducing process, so that the interval between the lens unit 40 and the recording medium 50 can be constantly maintained.

The recording/reproducing apparatus according to another embodiment includes two lens units. For example, in order to guarantee compatibility between a near-field recording/reproducing apparatus including a near-field forming lens and a conventional recording/reproducing apparatus, the above-mentioned recording/reproducing apparatus also includes a conventional lens.

In order to guarantee compatibility between the recording/reproducing apparatus and the blu-ray disc (BD), the above-mentioned embodiment also includes a lens of the BD. However, the above-mentioned embodiment is not limited to the above-mentioned example, and can also be applied to other examples. For the convenience of description and better understanding of the present invention, the same parts as those of the previously-stated embodiment will herein be omitted, and only different parts will hereinafter be described.

The optical system according to the present invention includes a first objective lens unit and a second objective lens unit. The first objective lens unit includes a first objective lens 41 and a near-field forming lens 42. The second objective lens unit includes a second objective lens 43. In this case, the location relationship between the first lens unit and the second lens unit is a matter of grave concern.

Figure 10:
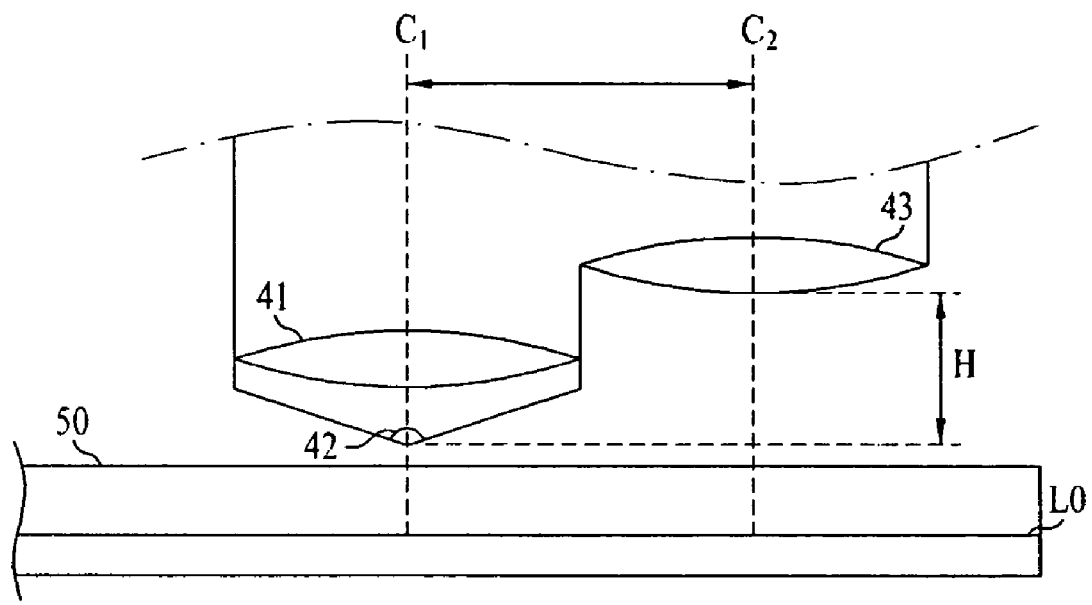
FIG. 10 is a cross-sectional view illustrating a lens contained in the recording/reproducing apparatus and a recording medium according to still another embodiment of the present invention.

As shown in FIG. 10, the distance (hereinafter referred to as a center distance) between the center point C1 of the first lens unit 41 and the center point C2 of the second lens unit 43 should be longer than the sum of radiuses of individual lens units.

For example, as shown in FIG. 10, a minimum center distance is equal to the sum of the radius of the first objective lens 41 and the radius of the second objective lens 43.

In the meantime, if the center distance is very long, the other lens unit (i.e., the second lens unit) may collide with the recording medium 50 by the tilt or vibration encountered while data is recorded or reproduced using the first lens unit. Therefore, the center distance may be limited to a specific value, which is higher than the sum of the radiuses of individual lens units by 2 mm.

In the meantime, the interval between the first lens unit and the recording medium 50 is different from the interval between the second lens unit and the recording medium 50.

For example, if data is recorded using the first lens unit, the interval between the near-field forming lens 42 and the recording medium 50 is maintained at a value of several nanometers, as shown in FIG. 10. In this case, if the second lens unit is located at the same height as the first lens unit, the second lens unit collides with the recording medium 50 although a small number of vibrations occur. Therefore, the interval between the second lens unit and the recording medium 50 must be longer than the interval between the first lens unit and the recording medium 50.

In this case, a difference in height between the first lens unit and the second lens unit occurs, as denoted by "H" in FIG. 10.

Figure 12A:
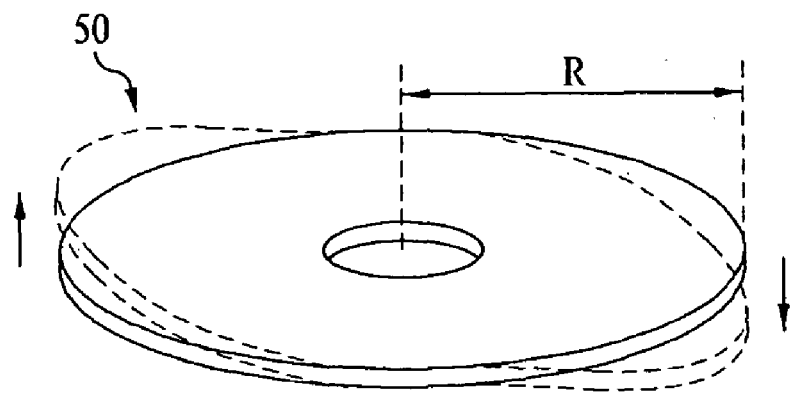
FIG. 12A is an example of the vibration of a recording medium according to the present invention.
Figure 12B:
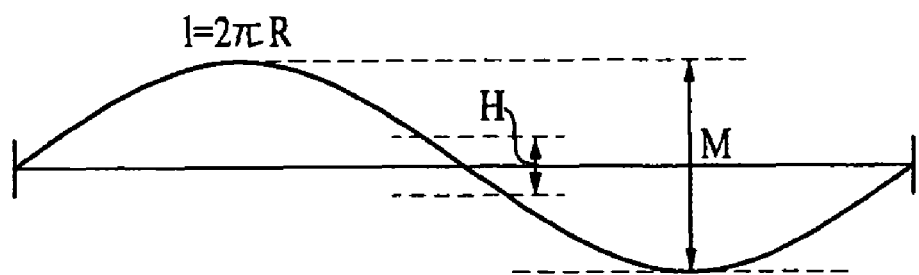
FIG. 12B is a variation curve caused by the vibration of the recording medium according to the present invention.

FIG. 12B is a variation curve caused by the vibration of the recording medium according to the present invention. In the case of considering vibration as shown in FIG. 12B, a vibration range (H) corresponding to the center distance of the first and second lens units is acquired, so that the H value is established in consideration of the acquired result.

If the center distance is 2 mm, and a physical tilt limitation angle (α) is limited to 0.085°~0.115° (about 0.1°), the height difference (H) corresponding to the angle of 0.1° at an inflection point having the highest vibrations is 0.035 mm. Therefore, the distance between the second objective lens 43 of FIG. 10 and the recording medium 50 is longer than the distance between the near-field forming lens 42 and the recording medium 50 by at least 0.035 mm. However, the distance between the second objective lens 43 and the recording medium is not higher than a focal length of the second objective lens 43.

In order to properly employ the first lens unit and the second lens unit, the optical system of the recording/reproducing apparatus further includes an additional separating/combining unit (not shown) capable of separating an optical signal toward the first lens unit from the other optical signal toward the second lens unit.

As described above, the interval between the recording medium 50 and the lens unit 40 is very short to form a near-field. Therefore, if the tilt of either the recording medium 50 or the lens unit 40 is not controlled during the recording/reproducing process or the use time of the recording/reproducing apparatus, the possibility of generating a collision between the recording medium 50 and the lens unit increases.

In order to solve the collision problem the present invention provides a method for physically and optically controlling the tilt of either the lens unit or the recording medium 50 contained in the recording/reproducing apparatus. In this case, it should be noted that the tilt control method according to the present invention is not limited to any one of the embodiments of the above-mentioned recording/reproducing apparatuses. A detailed description of the tilt control method will hereinafter be described.

Regarding the tilt between the recording medium 50 and the lens unit 40, the present invention detects a physical tilt limitation angle, so that it controls the recording medium 50 and the lens unit 40 to not escape from the physical tilt limitation angle. A detailed description thereof will hereinafter be described with reference to FIGS. 11A and 11B.

Figure 11A:
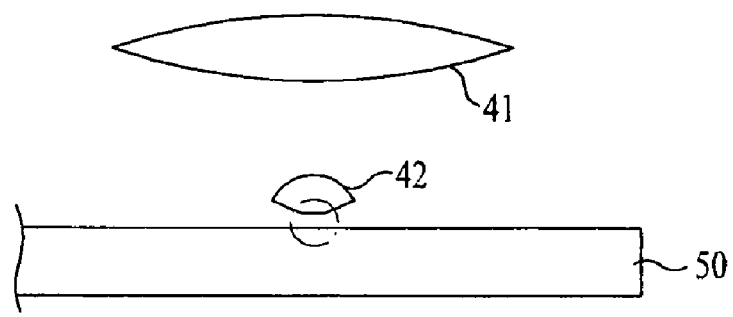
FIG. 11A shows a lens and a recording medium according to the present invention.

FIG. 11A shows the lens unit 40 including both the objective lens 41 and the near-field forming lens 42 along with the recording medium 50. In this case, as stated above, the interval between the near-field forming lens 40 and the recording medium 50 is a value of several nanometers, so that the near-field forming lens 40 is very close to the recording medium 50.

Figure 11B:
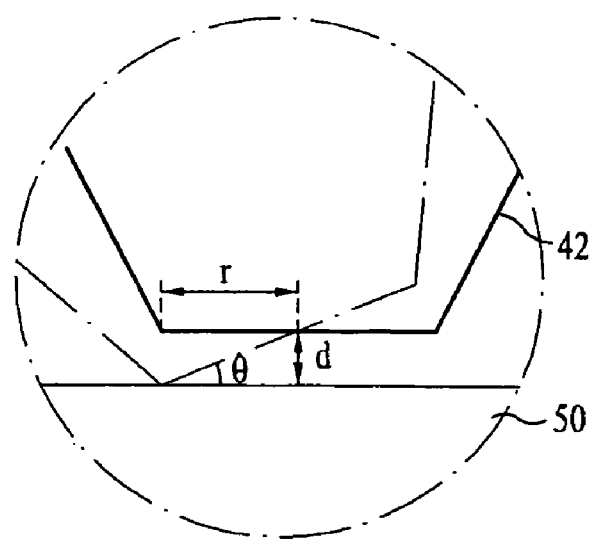
FIG. 11B is a partially-enlarged view of the dotted circular part shown in FIG. 11A according to the present invention.

FIG. 11B is a partially-enlarged view of the dotted circular part shown in FIG. 11A according to the present invention. As shown in FIG. 11B, it is assumed that a bottom radius at a lower part of the near-field forming lens 42 is "r" and the interval between the near-field forming lens 42 and the recording medium 50 is "d". In this case, provided that a physical-range limitation angle, by which the lens unit is maximally tilted to the recording medium until the lens unit and the recording medium are folded, is set to a physical tilt limitation angle ($\alpha$), the physical tilt limitation angle ($\alpha$) can be calculated by the following Equation 2:

$$\alpha = \tan^{-1}\left(\frac{d}{r}\right) \qquad \text{[Equation 2]}$$

For the convenience of description, a detailed embodiment will hereinafter be described. The higher the value "r", the lower the physical tilt limitation angle ($\alpha$). For example, according to the embodiment for employing the hemispherical near-field forming lens 42 shown in FIG. 3, if the radius of the hemisphere is 1 mm, the physical tilt limitation angle ($\alpha$) is very small, so that the above-mentioned embodiment may have difficulty in controlling the recording/reproducing apparatus.

Therefore, in order to solve the above-mentioned problem, the embodiment may use the near-field forming lens 42 capable of minimizing an area contacting the recording medium 50, so that the physical tilt limitation angle ($\alpha$) also increases. Accordingly, this embodiment will hereinafter be described using a specific case associated with the near-field forming lens 42 of FIG. 7A as an example.

In this case, if the radius of the bottom area 42b of FIG. 7A is very short, it is difficult to illuminate the optical signal on a record layer of the recording medium. Therefore, the radius (r) of the bottom area of the near-field forming lens 42 is exemplarily set to 30 μm~40 μm.

However, the radius (r) of the bottom area of the near-field forming lens 42 is not limited to the values 30 μm~40 μm, and can also be set to other values as necessary.

In this case, the "d" value may be set to 30 nm, so that a signal formed by the reflected optical signal can be clearly observed within the near-field limitation range.

In the case of calculating the above-mentioned values ($\alpha$) using Equation 2, the physical tilt limitation angle ($\alpha$) is set to 0.115° if the "r" value is 30 μm, and is set to 0.085° if the "r" value is 40 μm. Therefore, in the case of controlling the recording medium using the physical tilt limitation angle ($\alpha$), the above-mentioned embodiment controls the lens unit 40 or the recording medium 50 to not exceed 0.115° or 0.085°. In this case, the tilt range of the lens unit 40 can be limited using the actuator of the pickup unit, and can also be modified in various ways to implement the same effect.

In the meantime, according to the tilt between the recording medium 50 and the lens unit 40, an optical limitation incident angle is detected so that the tilt between the recording medium 50 and the lens unit 40 may be controlled to not exceed the optical limitation incident angle. In more detail, the incident angle of the optical signal is decided using a coma-aberration. The coma-aberration occurs when the recording medium is not perpendicular to the optical axis. Optically, the coma-aberration must not exceed the range of $0.07\lambda$, so that the allowable range of the incident angle of the optical signal can be calculated.

In a first case, in order to limit the coma-aberration within $0.07\lambda$ on the condition that the NA of the lens unit 40 is 1.6 and the refractive index of the passivation layer is 1.7n, an error of the incident angle of the optical signal should be equal to or less than about 0.6°.

In a second case, in order to limit the coma-aberration within $0.07\lambda$ on the condition that the NA is 1.85 and the refractive index (n) of the passivation layer is 1.95, an error of the incident angle of the optical signal should be equal to or less than about 0.4°. Therefore, the recording/reproducing apparatus controls the lens unit 40, so that the incident optical signal does not exceed 0.6° in the above-mentioned first case, or the incident optical signal does not exceed 0.4° in the above-mentioned second case.

The control method according to the present invention compares the physical tilt limitation angle ($\alpha$) with the optical-limitation incident angle ($\beta$), so that the lens unit 40 can be controlled by any one of the angles ($\alpha$, $\beta$). For example, the physical tilt limitation angle ($\alpha$) is much less than the optical-limitation incident angle ($\beta$) 0.6° or 0.4°. Accordingly, if the above-mentioned control method controls only the physical tilt limitation angle ($\alpha$), the range of the optical limitation incident angle ($\beta$) can be satisfied.

In this case, the tilt of the lens unit 40 is controlled and at the same time the vibration of the recording medium 50 is also controlled. In this case, the vibration indicates the recording medium 50's vertical movement influenced by the rotation of the recording medium 50. For example, as shown in FIG. 12A, the recording medium rotates simultaneously while vibrating in a vertical direction. The vibration of the rotating recording medium 40 maximally occurs along the circumference of the recording medium 50, and has a period shown in FIG. 12B.

In this case, if the radius of the recording medium 50 is R, the total length (l) is $2\pi R$. If an interval between a maximum point and minimum point is measured on the condition that the radius R is 6 cm, the maximum value M in variation of the interval is 0.1 mm. Therefore, the controller 3 can limit the vibration range of the recording medium 50 to 0.1 mm.

Due to a high NA of the lens unit 40 and a refractive index of the substrate or passivation layer of the recording medium 50, the recording medium 50 according to the present invention has a high spherical aberration (SA). In this case, the spherical aberration indicates that the light, which has been reflected or refracted at a single point, is not collected again at the single point due to curvature. If the control method does not compensate for the spherical aberration, data cannot be recorded or reproduced at a correct location of the recording medium 50.

In this case, the spherical aberration (SA) can be calculated by the following equation 3:

$$SA = -\frac{n_4 - 1}{8 \times n^3 \times \lambda} \Delta d \times 2 \times NA^4 \qquad \text{[Equation 3]}$$

In Equation 3, if the recording medium 50 has a substrate or passivation layer, the value "n" is indicative of a refractive index of the passivation layer. Also, "$\lambda$" is indicative of a wavelength of the optical signal, "d" is indicative of a distance error, and NA is indicative of a numeric aperture of the lens unit 40.

Figure 13:
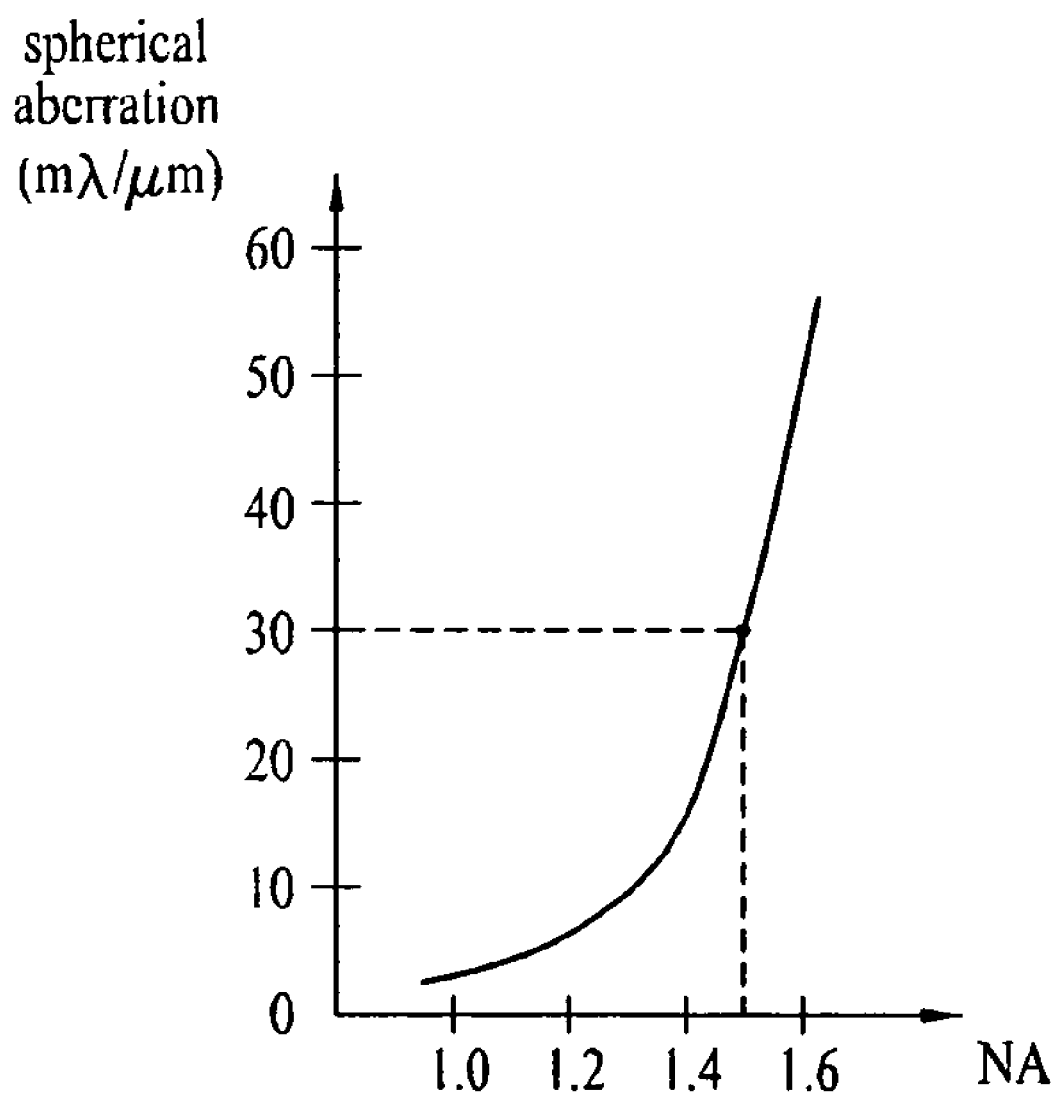
FIG. 13 is a correlation diagram illustrating a variation of a spherical aberration influenced by a numeric aperture (NA) of the lens according to the present invention.

FIG. 13 is a correlation diagram illustrating a variation of a spherical aberration influenced by a numeric aperture (NA) of the lens according to the present invention. The spherical aberration of FIG. 13 is acquired when a refractive index of the substrate or passivation layer of the recording medium 50 is 1.7.

If the NA is 1.5, the spherical aberration of 30 mλ per 1 μm occurs. If the above-mentioned spherical aberration of 30 m λ is not compensated, data cannot be recorded or reproduced.

In the recording medium 50, a first record layer (L0) primarily accessed by the recording/reproducing apparatus to acquire information of the recording medium 50 is fixed to a specific location to prevent the spherical aberration from being changed.

The recording medium 50 including the passivation layer will hereinafter be described as an example.

Figure 14A:
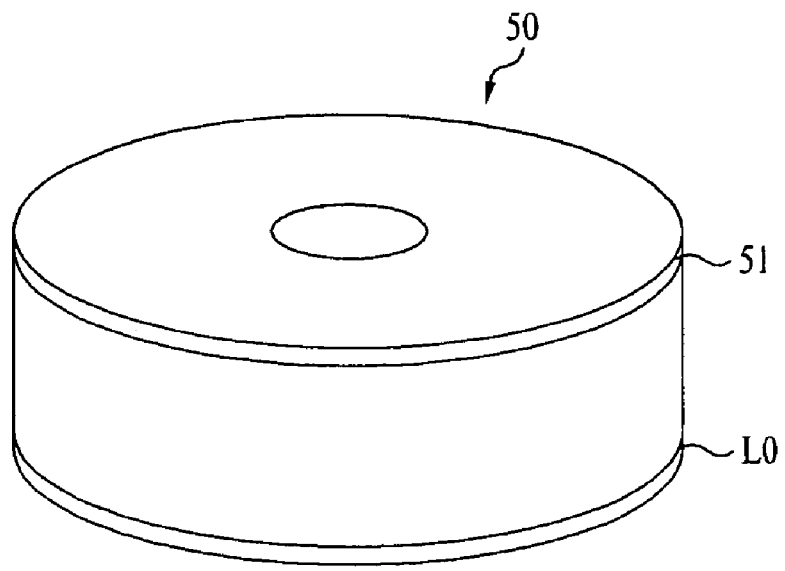
FIGS. 14A and 14B are perspective views illustrating a recording medium according to the present invention.
Figure 14B:
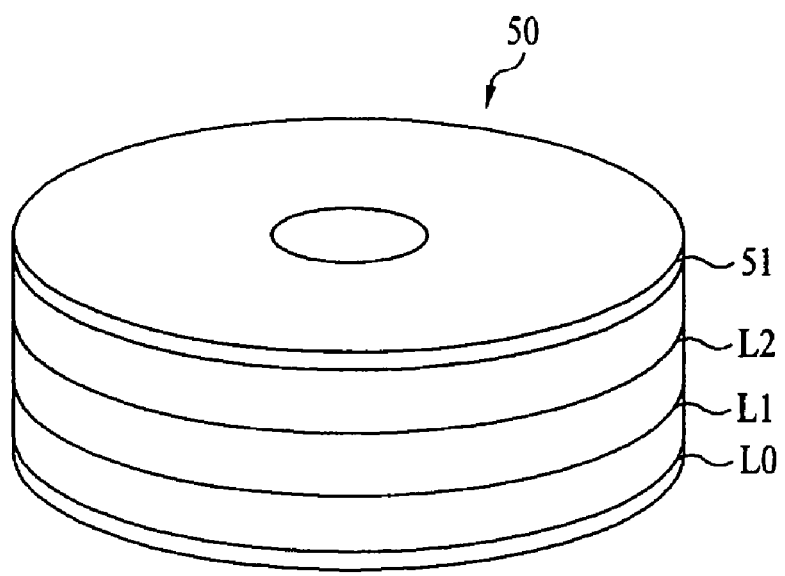

As shown in FIG. 14A, the first record layer L0 is spaced apart from the recording medium 50 including the passivation layer, and is fixed at a specific location. The first record layer L0 has the same location in a single-layered medium shown in FIG. 14A and a multi-layered medium shown in FIG. 14B. In this case, the thickness of the passivation layer 51 contained in the recording medium 50 is a matter of great concern.

If the thickness of the passivation layer 51 gradually increases, the bottom radius r of the near-field forming lens 42 shown in FIG. 11B should be gradually increased to illuminate the optical signal onto the record layer (L0). However, if the bottom radius r of the near-field forming lens 42 of FIG. 11B gradually increases, the physical tilt limitation angle (α) gradually decreases.

In the meantime, if the passivation layer 51 has a very thin thickness, it is difficult to protect the record layer from others. Therefore, the passivation layer 51's thickness should be properly determined in consideration of the physical tilt limitation angle (α).

Provided that the NA value is 1.6~1.85 and a refractive index of the recording-medium passivation layer is 1.7~2.0, the substrate or passivation layer must have a thickness of about 5 μm, so that the radius r of the near-field forming lens 42 can reach 40 μm.

As apparent from the above description, the optical pickup unit, the recording/reproducing apparatus, the control method, and the recording medium according to the present invention have the following effects.

The present invention provides an effective lens capable of effectively recording/reproducing data using the near-field.

The present invention provides an optical pickup unit and a recording/reproducing apparatus, which can use the near-field simultaneously while using the conventional recording medium.

The present invention provides a method and apparatus for effectively controlling the tilt or vibration while data is recorded or reproduced using the near-field.

The present invention provides a recording medium for use in the near-field.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An optical pickup apparatus comprising;
   a first lens unit including a first objective lens and a high-refraction lens;
   a second lens unit including a second objective lens; and
   at least one separating/combining unit for separating or combining paths of an optical signal passing through the first or second lens unit,
   wherein there is a height difference between the first lens unit and the second lens unit,
   wherein the height difference is decided in consideration of a physical tilt limitation angle or a vibration range during a recording/reproducing operation,
   wherein the physical tilt limitation angle is calculated by the following equation, $$\alpha = \tan^{-1}\left(\frac{d}{r}\right),$$

wherein a bottom radius at a lower part of the high-refraction lens is r and an interval between the high-refraction lens and a recording medium is d,
   wherein the vibration range is limited to maximum of 0.1 mm.

2. The apparatus according to claim 1, wherein a distance between the second lens unit and a recording medium does not exceed a focal length.

3. The apparatus according to claim 1, wherein:
   a minimum center distance between a center axis of the first lens unit and a center axis of the second lens unit is equal to the sum of a radius of the first lens unit and a radius of the second lens unit.

4. The apparatus according to claim 3, wherein:
   a maximum center distance between the center axis of the first lens unit and the center axis of the second lens unit is higher than the minimum center distance about 2 mm.

5. The apparatus according to claim 1, wherein the high-refraction lens has a refractive index of at least 2.

6. The apparatus according to claim 1, wherein a numeric aperture (NA) of the first lens unit is 1.45~1.85.

7. The apparatus according to claim 1, wherein the high-refraction lens has a spherical aberration, and the first objective lens compensates for the spherical aberration of the high-refraction lens.

8. The apparatus according to claim 1, wherein the high-refraction lens is configured in the form of a conical structure.

9. The apparatus according to claim 1, wherein:
   One end of the high-refraction lens is hemispherically shaped to face the first objective lens, and the other end of the high-refraction lens is conically shaped to face a recording medium.

10. The apparatus according to claim 9, wherein:
    A diameter of a bottom area of the conical structure is 30 μm~40 μm.

11. An apparatus for recording/reproducing data comprising:
    a first lens unit including a first objective lens and a high-refraction lens;
    a second lens unit including a second objective lens;
    at least one separating/combining unit for separating or combining paths of an optical signal passing through the first or second lens unit;
    a signal generator for generating a control signal corresponding to an interval between the first lens unit and a recording medium using an optical signal received from the first lens unit; and a control part configured to control the interval between the first lens unit and the recording medium within a predetermined range using the control signal, wherein there is a height difference between the first lens unit and the second lens unit, wherein the height difference is decided in consideration of a physical tilt limitation angle or a vibration range during a recording/reproducing operation, wherein the physical tilt limitation angle is calculated by the following equation, $$\alpha = \tan^{-1}\left(\frac{d}{r}\right),$$

wherein a bottom radius at a lower part of the high-refraction lens is r and an interval between the high-refraction lens and a recording medium is d, wherein the vibration range is limited to maximum of 0.1 mm.

12. The apparatus according to claim 11, wherein the signal generator generates the control signal corresponding to intensity of an optical signal fully reflected from the high-refraction lens.

13. The apparatus according to claim 11, wherein the control part enables the control signal to be maintained at a predetermined value.

14. The apparatus according to claim 11, wherein the control part limits a tilt of the high-refraction lens to a maximum of 0.1°.

15. The apparatus according to claim 11, further comprising:
an interface for receiving a record command or a reproduction command, and transmitting a signal corresponding to the received command to the control part.

16. A recording medium for use in the recording/reproducing apparatus of claim 11, comprising:
at least one record layer,
wherein a location of a first record layer is fixed.

17. The recording medium according to claim 16, further comprising:
a passivation layer,
wherein a thickness of the passivation layer is decided in consideration of a physical tilt limitation angle.

18. The recording medium according to claim 17, wherein the passivation layer has a thickness of 5 μm.

* * * * *